Patented Feb. 7, 1950

2,496,364

UNITED STATES PATENT OFFICE 2,496,364

3 - SULFANILAMIDO-BENZOTRIAZINES-1,2,4 AND METHOD FOR THEIR PREPARATION

Frank J. Wolf, Westfield, and Karl Pfister, III, Summit, N. J., assignors to Merck & Co., Inc., Rahway, N. J., a corporation of New Jersey No Drawing. Application August 21, 1946, Serial No. 692,146

11 Claims. (Cl. 260—239.6)

This invention relates to the preparation of new chemical compounds by new and improved chemical procedures. More particularly, it is concerned with the preparation of certain new benzotriazine compounds.

The new chemical compounds produced in accordance with this invention possess therapeutic value for use under circumstances where sulfa drugs are ordinarily employed or as antimalarials.

Regarded in certain of its broader aspects the process in accordance with the present invention comprises condensing 3 - amino - benzotriazine-1,2,4 with p-nitrobenzene sulfonyl chloride in the presence of a basic liquid condensing agent such as pyridine to form 3-(p-nitrobenzenesulfon-amido)-benzotriazine-1,2,4, purifying and reducing the latter compound to form 3-sulfanilamido-benzotriazines-1,2,4. It has also been discovered that halo substituted compounds such as 3-amino-7-halo-benzotriazine-1,2,4 can be treated in like manner to recover the 3-sulfanilamido-7-halo-benzotriazine-1,2,4 compound.

This reaction as applied to the production of 3-sulfanilamidobenzotriazine-1,2,4 and 7-halo derivatives is indicated graphically as follows:

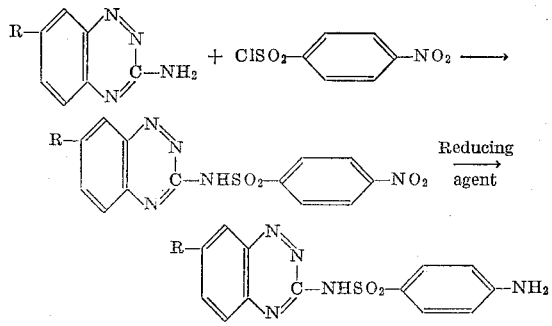

wherein R represents hydrogen and halogen substituents.

The starting material wherein R is hydrogen, namely 3-amino-benzotriazine-1,2,4 has previously been described in the chemical literature. Other starting materials wherein R is halogen, namely 3-amino-7-halo-benzotriazine-1,2,4 can be prepared by reducing a 3-amino-7-halo-benzo-triazine-1,2,4-oxide-1 with hydrogen in the presence of a hydrogenation catalyst. This process and the products thereby secured are fully disclosed and claimed in our copending application, Serial No. 661,083, filed April 10, 1946, now Patent No. 2,489,351.

In accordance with a preferred embodiment of our invention 3-amino-benzotriazine-1,2,4 or a 3-amino-7-halo-benzotriazine-1,2,4 substituted derivative is condensed with p-nitrobenzenesulfonyl chloride in the presence of a basic liquid condensing agent such as pyridine. It is preferable to employ an excess of the condensing agent which acts as a medium for the reaction and which also reacts with the hydrochloric acid formed during the reaction to form pyridine hydrochloride. The condensation is carried out at elevated temperatures preferably of the order of 90 to 120° C. When reaction is complete, the condensing agent is removed by concentration under vacuum. The residue thus obtained is a mixture of 3-(p-nitro-benzenesulfonamido)-benzotriazine-1,2,4 and by-products. The desired product is isolated as the sodium salt by a procedure which involves treating the crude residue with hot sodium hydroxide and cooling the solution to precipitate the sodium salt of 3-(p-nitrobenzenesulfonamido)-benzotri-azine-1,2,4. The salt is recovered and converted to the acid by treating an aqueous solution of the salt with acetic acid to precipitate 3-(p-nitro-benzenesulfonamido)-benzotriazine-1,2,4. Purification of these crystals can be accomplished by dissolving the crude product in ammonia, treating the solution with activated charcoal, filtering and recrystallizing the produce from an acetic acid solution.

The reduction of 3 - (p - nitrobenzenesulfon-amido)-benzotriazine-1,2,4 is carried out by refluxing an alcoholic mixture of the latter compound, iron powder and hydrochloric acid for about seven hours. The reaction mixture is concentrated dry and the residue thus obtained extracted with ammonia, norited, and filtered. Treatment of the filtrate with acetic acid results in the precipitation of 3-sulfanilamidobenzotri-azine-1,2,4.

The following examples illustrate a method of carrying out the present invention but it is to be understood that these examples are given by way of illustration and not of limitation.

*Example 1*

A suspension of 19.6 g. of 3-amino-benzotri-azine-1,2,4 in 100 cc. of dry pyridine was heated to 95° C. on a steam bath while 38.8 g. of p-nitro-benzenesulfonyl chloride was added gradually with stirring. After addition of the reactants, which required about 35 minutes, heating of the mixture was continued for a total of one hour. The mixture was then concentrated under vacuum, while the pyridine was replaced by water until a yellow sticky residue was suspended in water. The mixture was filtered and the residue was washed with water. The residue was then extracted hot with 2×200 cc. of 1.25 N sodium hydroxide. The extracts were cooled in ice and lustrous yellow crystalline plates of the sodium salt of 3-(p-nitrobenzenesulfonamido)-benzotriazine-1,2,4 precipitated. The crystals were separated from solution by filtration and the combined yields of the salt were extracted with cold water until a sample of filtrate gave no precipitate with acetic acid. The extracts were then combined and acidified with acetic acid until acid to Congo paper, whereupon yellow crystals of 3-(p-nitrobenzenesulfonamido) - benzotriazine - 1,2,4 precipitated. The crystals were removed by filtration, washed with water and largely dissolved in 100 cc. of warm 6 N ammonia. The solution was then norited and filtered. Crystals having a melting point of 250-252° C. were precipitated from solution upon the addition of acetic acid until acidic to Congo paper.

Hair-fine yellow needles, having a melting point of 252-253° C. were obtained by dissolving the above crystals again in ammonia and precipitating with acetic acid.

Anal. calcd. for $C_{13}H_9N_5O_4$: C, 47.13; H, 2.74. Found: C, 47.27; H, 2.95.

10.3 g. of 3-(p-nitrobenzenesulfonamido)-benzotriazine-1,2,4 was refluxed with 34 g. iron powder, 565 cc. of alcohol and 2 cc. of hydrochloric acid (1:1) for seven hours. Norit was added to the mixture during last 15 minutes of refluxing. The solution was then filtered hot and the residue (A) washed with hot alcohol.

The alcohol filtrate was concentrated dry under vacuum and the residue extracted with 300 cc. of 3 N ammonia (norit) on the steam bath. The mixture was filtered and acetic acid was added to the filtrate until there was no further precipitation. 3-sulfanilamidobenzotriazine-1,2,4 precipitated as a flocculent material which soon turned granular. This granular material had a melting point of 213-214° C. Purification of the product was accomplished by dissolving the crystals in 200 cc. of 3 N ammonia and 50 cc. of water and warming the mixture. Norit was added to the solution and the solution then filtered. Acetic acid was added to the filtrate until there was no further precipitation and crystals having a melting point of 216-218° C. were recovered. Another crop of crystals having a melting point of 214-216° C. was obtained by extracting residue A with hot 3 N ammonia, precipitating with acetic acid and again purifying with ammonia and precipitating with acetic acid.

Similarly prepared crystals having a melting point of 216-217° C. were analyzed and the following results were obtained: Anal. calcd. for $C_{13}H_{11}N_5O_2$: C, 51.82; H, 3.68; N, 23.25. Found: C, 52.00; H, 3.86; N, 23.14.

*Example 2*

A mixture of 10 gms. of 3-amino-7-chloro-benzotriazine-1,2,4, 22 gms. of p-nitrobenzenesulfonyl chloride and 125 ml. of pyridine was refluxed for four hours. At the end of this time the dark solution was concentrated to dryness in vacuo. The residue was extracted with 500 ml. of hot 1.25 N sodium hydroxide and the solution norited, and filtered. Upon cooling the filtrate, the sodium salt of 3-(p-nitrobenzenesulfonamido)-7-chloro-benzotriazine-1,2,4 crystallized from solution in yellow platelets. This salt was removed by filtration, taken up in 100 ml. of hot water and acidified with glacial acetic acid. The yellow-green precipitate of 3-(p-nitrobenzene-sulfonamido) - 7 - chlorobenzotriazine-1,2,4 that formed was separated from solution by filtration and dried. These crystals had a melting point of 238-239° C.

Crystals having a melting point of 240° C. were obtained by dissolving the crude crystals in 6 N ammonia, filtering and precipitating with glacial acetic acid.

Anal. calcd. for $C_{13}H_8N_5O_4Cl$: C, 42.8; H, 2.2. Found: C, 43.2; H, 3.1.

The reduction of 3-(p-nitrobenzenesulfonamido)-7-chloro-benzotriazine-1,2,4 was carried out by refluxing 2.4 gms. of the material with 8 gms. of iron powder in 120 ml. of 2B alcohol and 0.5 ml. of concentrated hydrochloric acid for seven hours. The solution at the end of this time was made alkaline with 2.5 N sodium hydroxide and filtered. The alcohol filtrate was concentrated to dryness in vacuo. The residue was extracted with 3 N ammonia water, norited and filtered. A bright yellow precipitate of 3-sulfanilamido-7-chloro-benzotriazine-1,2,4 was obtained from the filtrate by acidifying with glacial acetic acid. The crystalline material recovered had a melting point of 218-219° C.

Crystals having a melting point of 219-220° C. were recrystallized from 35% acetic acid.

Anal. calcd. for $C_{13}H_{10}N_5O_2Cl$: C, 46.50; H, 3.01; N, 20.86. Found: C, 46.76; H, 3.16; N, 20.98.

The foregoing description and examples are intended to be illustrative only. Any modifications of or variations therefrom, which conform to the spirit of the invention are intended to be included within the scope of the claims.

We claim:
1. A compound represented by the formula

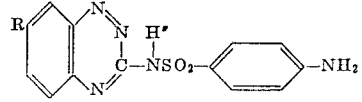

wherein R is selected from the class consisting of hydrogen and halogen substituents.

2. 3-sulfanilamido-benzotriazine-1,2,4.

3. 3-sulfanilamido-7-halo-benzotriazine-1,2,4.

4. 3 - sulfanilamido - 7 - chloro - benzotriazine-1,2,4.

5. The process that comprises condensing compounds selected from the class consisting of 3-amino-benzotriazine-1,2,4 and 3-amino-7-halo-benzotriazine-1,2,4 with p-nitrobenzenesulfonyl chloride in the presence of a basic condensing agent, recovering the corresponding 3-(p-nitrobenzenesulfonamido)-benzotriazine-1,2,4 and reducing the latter compound to form the 3-sulfanilamidobenzotriazine-1,2,4.

6. The process that comprises condensing 3-amino-benzotriazine-1,2,4 with p-nitrobenzenesulfonyl chloride in the presence of a basic condensing agent, recovering 3-(p-nitrobenzenesulfonamido)-benzotriazine-1,2,4 and reducing the latter compound to form 3-sulfanilamidobenzotriazine-1,2,4.

7. The process that comprises condensing 3-amino-7-halo-benzotriazine-1,2,4 with p-nitrobenzenesulfonyl chloride in the presence of a basic condensing agent, recovering 3-(p-nitrobenzenesulfonamido) - 7 - halo - benzotriazine-1,2,4 and reducing the latter compound to form 3-sulfanilamido-7-halo-benzotriazine-1,2,4.

8. The process that comprises condensing 3-amino-7-chloro-benzotriazine-1,2,4 with p-nitrobenzenesulfonyl chloride in the presence of a basic condensing liquid, recovering 3-(p-nitrobenzenesulfonamido) - 7 - chloro - benzotriazine- 1,2,4 and reducing the latter compound to form 3-sulfanilamido-7-chloro-benzotriazine-1,2,4.

9. The process that comprises reacting 3-amino-benzotriazine-1,2,4 with p-nitrobenzenesulfonyl chloride in pyridine for a time and at a temperature to effect condensation, evaporating the reaction mixture under reduced pressure, extracting the dry residue thus obtained with hot sodium hydroxide, cooling the solution to precipitate the sodium salt of 3-(p-nitrobenzenesulfonamido)-benzotriazine, extracting the latter compound with water and reacting the aqueous solution with acetic acid to precipitate 3-(p-nitrobenzenesulfonamido)-benzotriazine-1,2,4, reacting the latter compound with a mixture of alcohol, iron and hydrochloric acid for a time and at a temperature to effect reduction of the compound, evaporating the reaction mixture under reduced pressure, extracting the dry residue thus obtained with ammonia, and adding acetic acid to precipitate 3-sulfanilamido-benzotriazine-1,2,4.

10. The process that comprises reacting 3-amino-7-halo-benzotriazine-1,2,4 with p-nitrobenzenesulfonyl chloride in pyridine for a time and at a temperature to effect condensation, evaporating the reaction mixture under reduced pressure, extracting the dry residue thus obtained with hot sodium hydroxide, cooling the solution to precipitate the sodium salt of 3-(p-nitrobenzenesulfonamido) - 7 - halo-benzotriazine, extracting the latter compound with water and reacting the aqueous solution with acetic acid to precipitate 3-(p - nitrobenzenesulfonamido) - benzotriazine-1,2,4, reacting the latter compound with a mixture of alcohol, iron and hydrochloric acid for a time and at a temperature to effect reduction of the compound, evaporating the reaction mixture under reduced pressure, extracting the dry residue thus obtained with ammonia, and adding acetic acid to precipitate 3-sulfanilamido-7-halo-benzotriazine-1,2,4.

11. The process that comprises reacting 3-amino-7-chloro-benzotriazine-1,2,4 with p-nitrobenzenesulfonyl chloride in pyridine for a time and at a temperature to effect condensation, evaporating the reaction mixture under reduced pressure, extracting the dry residue thus obtained with hot sodium hydroxide, cooling the solution to precipitate the sodium salt of 3-(p-nitrobenzenesulfonamido) - 7 - chloro - benzotriazine, extracting the latter compound with water and reacting the aqueous solution with acetic acid to precipitate 3 - (p - nitrobenzenesulfonamido)-benzotriazine-1,2,4, reacting the latter compound with a mixture of alcohol, iron and hydrochloric acid for a time and at a temperature to effect reduction of the compound, evaporating the reaction mixture under reduced pressure, extracting the dry residue thus obtained with ammonia, and adding acetic acid to precipitate 3-sulfanilamido-7-chloro-benzotriazine-1,2,4.

FRANK J. WOLF.
KARL PFISTER, III.

REFERENCES CITED

The following references are of record in the file of this patent:

UNITED STATES PATENTS

| Number | Name | Date |
| --- | --- | --- |
| 2,197,357 | Widmer et al. | Apr. 16, 1940 |
| 2,243,324 | Williams | May 27, 1941 |
| 2,259,222 | Ewins et al. | Oct. 14, 1941 |
| 2,407,177 | Roblin et al. | Sept. 3, 1946 |

OTHER REFERENCES

Rajagopalan, Current Science, vol. 11, p. 146 (Apr. 26, 1942).